I. STRIPE.
Apparatus for Laying Drain Tile.
No. 134,228. Patented Dec. 24, 1872.
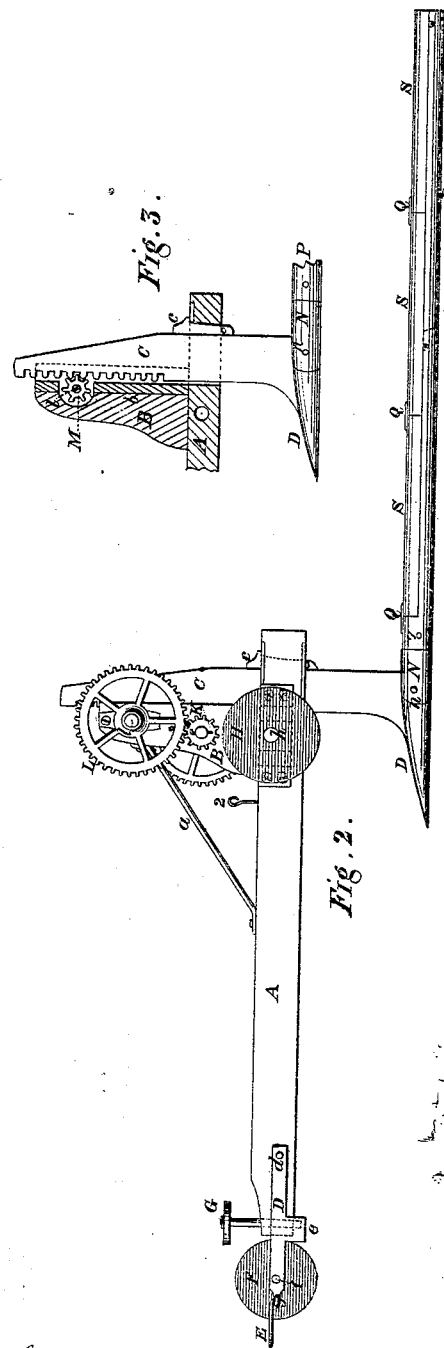
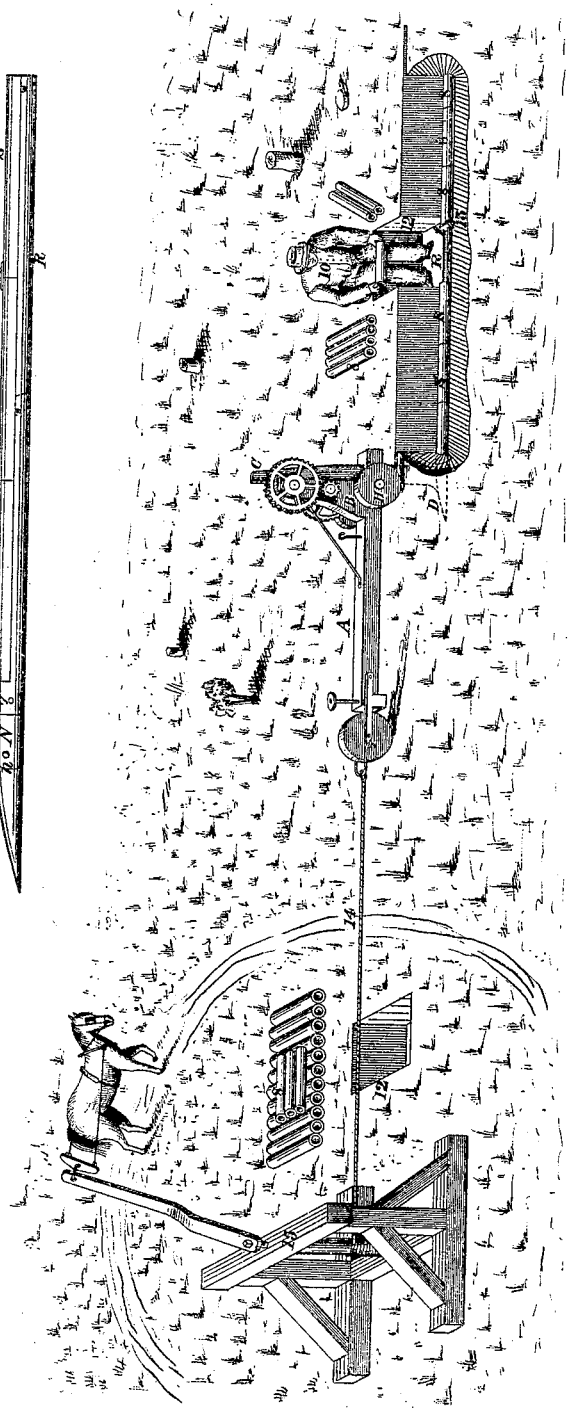

I. STRIPE.
Apparatus for Laying Drain Tile.
No. 134,228. Patented Dec. 24, 1872.
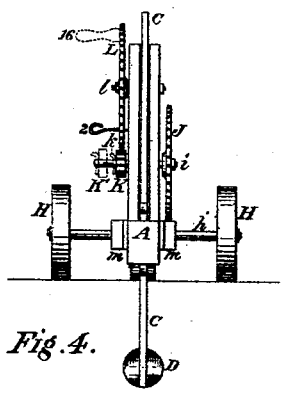
Fig. 4.
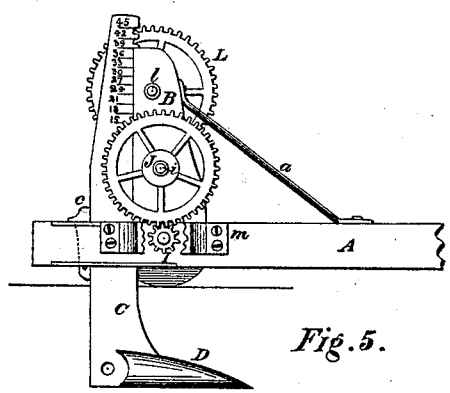
Fig. 5.
Fig. 6.
Figs. 7.
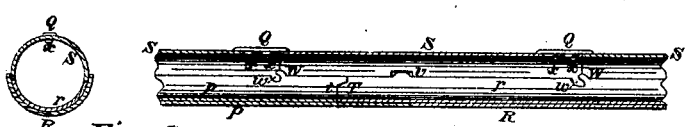
Figs. 8.
Fig. 9.
Jennie M. Grant.
Andrew Choffin. } Witnesses.
Isaac Stripe, Inventor
by Job Abbott, Attorney.
AM. PHOTO-LITHOGRAPHIC CO.N.Y. (OSBORNE'S PROCESS.)

UNITED STATES PATENT OFFICE.

ISAAC STRIPE, OF NEW BERLIN, OHIO.

IMPROVEMENT IN APPARATUS FOR LAYING DRAIN-TILE.

Specification forming part of Letters Patent No. 134,228, dated December 24, 1872; antedated December 20, 1872.

*To all whom it may concern:*

Be it known that I, ISAAC STRIPE, of New Berlin, in the county of Stark and State of Ohio, have invented certain new and useful Improvements in Apparatus for Laying Drain-Tiles; and that the following is a full, clear, and exact specification thereof, which will enable others skilled in the art to make and use the said invention.

My invention relates to an improved construction of a mole-plow, and of certain attachments thereto, the whole forming an apparatus by means of which the ordinary drain-tile may be cheaply and accurately placed in the requisite position in the ground to form tile-drains. Said invention consists in connecting the mole-standard and wheels of the plow by means of suitable gearing, so that as the plow is drawn over the line of drainage the mole shall be gradually raised or lowered, as the case may be, in order to give the requisite fall to the drain when the plow is used on level ground. Said invention also consists in the combination, with the plow-mole, of a hinged die-head and a peculiarly-constructed metallic tube, said tube being made in sections in such a manner as to be readily placed in and taken out of the ground, and being so arranged that the tile may be placed in it, and then be drawn with it into the hole formed by the mole, when the tube may be withdrawn, leaving the tile in the ground in the proper position to form the drain.

In the accompanying drawing, Figure 1 is a view, showing the practical application of my apparatus. Fig. 2 is a side view of said apparatus. Fig. 3 is a sectional view of the plow-standard, showing the rack and pinion for moving the mole-standard. Fig. 4 is a rear view of said apparatus. Fig. 5 is a side view of the same, showing the side opposite that shown in Fig. 2. Fig. 6 is a longitudinal section of the lower half of the tile-conveying tube. Fig. 7 are side views and plans of two parts of said half, taken separately. Fig. 8 are cross-section and longitudinal section of said conveying-tube. Fig. 9 is a side view of a section of the upper half of said tube.

The plow-beam A is a heavy bar of wood, at the front end of which is secured the clevis D, which consists of two side bars, having hooks or eyes at their front ends, which are united by the underlying cross-piece $e$, which forms a bearing for the adjusting-screw G in the beam A. The wheel F is journaled by a bolt, $f$, between the clevis-bars D, and the draft is applied to a link, E, attached to the ends of the clevis-bars, and said bars are attached, by a journal-bolt, $d$, to the beam A, to allow of the adjustment of the running height of the front end of the plow-beam by turning the screw G so as to raise or lower the wheel F. The standard B is secured in the beam A, from which it is trussed by a brace, $a$, and its rear face is grooved to admit the front edge of the mole-standard C, which runs through a mortise in the beam A, and which has the mole D secured at its lower end. A wedge-shaped piece, $c$, forms the back bearing for the standard C, and strips of metal $b$ are set in the groove in the standard B to form the front and upper bearing for said standard. The main wheels H H of the plow are fastened on a shaft, $h$, which is journaled in the box pieces $m\ m$ on the sides of the beam A, (see Figs. 4 and 5,) and on which is secured a pinion, I, (see Fig. 5,) which meshes into a wheel, J, secured on a shaft, $i$, which runs through the standard B, and has the pinion K secured on its other end. The pinion K, when in gear, meshes into the wheel L, which is secured on a shaft, $l$, journaled in the standard B, and on this shaft $l$, in a cavity just back of the groove in the standard B, (see Fig. 3,) is a pinion, M, which meshes into the rack-teeth cut on the front face of the mole-standard C. The die-head N is hinged by a pin, $n$, to the lower corner of the mole-standard C and immediately back of the mole D, and is made of a section corresponding to that of the tile-conveying tube, which, in turn, is made of a circular, horseshoe, or other form, corresponding to the particular form of tile to be laid; the round tile being of the form shown. The drawing shows two sections, P and R, of the lower half, and three sections, S S S, of the upper half of the conveying-tube; but it will be understood that these numbers may be increased to any extent required to form a tube of the required length. The lower sections P are made of two pieces of sheet metal, P $p$, curved and fitted together, as shown, and the end $t$ of the upper piece $p$ is notched, as shown, and sits back of the end of the under piece P, and the notches U U are cut in the sides of the piece P, as shown on the left hand in Figs. 7. The end T of the upper piece $r$ of the section R is notched off at the corners so as to fit in the notched end $t$ of the upper piece $p$ of the section P, and this upper piece $r$ projects over the under piece R, and has the small pins $u$ $u$ in its sides, so that to unite the two sections, P and R, the operator places the end T of the piece $r$ into the notched end $t$ of the piece $p$, and then turns down the section R so as to bring the pins $u$ $u$ in the piece $r$ into the notches U U in the piece $p$, thus uniting the sections P and R in the manner shown in Figs. 2 and 6. The front end of the first lower section P is secured to the die-head N by a pin, 7, which runs through a ring formed on the end of the section, and through a projecting arm on the die-head.

The upper-section pieces S are of one thickness of sheet metal, and have the ears $w$ $w$ at their rear corners, and usually the notches $w'$ $w'$ at their front corners and the notches $v$ near their centers, and a small sliding bolt, Q, is secured, by headed pins $x$ $x$, (see Fig. 8,) at their rear ends and on their upper sides. The ears W W are formed on the upper pieces $p$ $r$ of the lower sections P R, and the upper sections S are secured in position by placing the ears $w$ $w$ of said sections under the ears W W on the lower sections, and then turning down the upper section S onto the upper pieces $p$ and $r$ of the lower sections and between the sides of the under pieces P and R of said sections, and sliding the bolt Q of the preceding upper section over the end of the section turned down, as shown in Fig. 8, the upper sections S being usually arranged to "break joints" with the lower sections P R, and the notches $w'$ and $v$ in the sections S being made to fit over the lugs raised for the pins $u$ and over the ears W in the pieces $p$ $r$ of the sections P R.

The manner of operating with this apparatus is as follows: A series of holes, 12, (see Fig. 1,) are dug along the proposed line of drain, of such depth as to just reach the level of the drain, and at such distances apart as to correspond with the length of conveying-tube to be used, said holes being a little longer than a section of the tube, and the distance between them being reduced at the upper end of the drain to avoid having to dig a long trench to allow of the removal of the conveying-tube at the end of the drain, the rear sections of the tube being removed as the tube passes the holes near the end of the drain until only a short length of tube is left to be taken out at the end. The machine is then placed on the ground, with the mole and standard D C in the first hole 12, and is drawn forward by a rope, 14, worked by the windlass 15, or in any other suitable manner. The operator 10, standing in the hole 12, lays the tile 8 into the first section P and puts on the first cover or upper section S, and as soon as the section S has been drawn nearly into the ground he attaches the second lower section R, lays in the tile, and puts on the second cover S, and so on until the whole length of tube has been laid in, when the mole will have appeared at the second hole 12. If the ground has a level surface the required fall for the drain is obtained by the gradual raising of the mole through the action of the gearing I J K L M on the toothed standard C, in a manner evident from the foregoing description of the machine. The amount of fall can be varied by changing the relative sizes of the pinion K and wheel L, and the gearing can be easily modified by the introduction of an idle wheel between the wheel and pinion L and K, or J and I, so as to produce the required fall by gradually sinking the mole D, which may be sometimes desirable in order to allow of the commencement of the drain at its upper instead of its lower end. When the surface of the ground itself has the required fall the pin $k$ can be taken out and the pinion K slid over into the position shown by dotted lines K', (see Fig. 4,) thus throwing the mole-raising mechanism out of gear, when the pin 2, inserted in a hole in the standard B and bearing against an arm of the wheel L, will prevent any change in the running depth of the mole. By applying a crank, 16, to the wheel L, as indicated by dotted lines in Fig. 4, when the pinion K is slid out of gear, as just described, the mole can be easily raised or lowered to just the proper height for the end of the drain. The whole length of conveying-tube having been drawn into the ground, and the mole having made its appearance at the second hole 12, the operator proceeds to that hole and there removes the first cover or upper section S as soon as it comes out, and fastens a bar, 13, over the lower half of the conveying-tube by means of two stakes, as shown in right-hand hole 12 in Fig. 1, so that as the tube is drawn forward the tile already in the tube will be held back by the bar 13, and be thus slid out of the rear end of the tube in proper position to form the drain. As the tile are pushed back by the bar 13 the operator lays in new tile, replaces the first cover S, removes the second cover, and fills in tile, and then replaces it, and so on until the whole tube passes the second hole 12, when he goes to the third hole and proceeds as before.

Having thus fully described the construction and operation of my improved apparatus, what I claim as new and of my invention, and desire to secure by Letters Patent, is—

1. The combination of the bearing-wheels H H and mole-standard C of a mole-plow with a gear-train driven by said wheels and acting on said standard, so as to gradually raise the mole, substantially as and for the purpose specified.

2. The combination, with the mole D, of a hinged die-head, N, and closed conveying-tube P R S S, said tube being made in sections and having a removable upper half, and serving to convey the tiles into the ground and there leave them in position to form the tile-drain, substantially as specified.

3. The herein-described conveying-tube, consisting of the tube-sections P R, constructed of the two parts P p and R r and with the notched ends T t, notches U U, ears W W, and pins u u, and of the cover-sections S having the ears w w, and sliding bolt Q, the several parts being constructed and combined as specified.

ISAAC STRIPE.

Witnesses:
 JOB ABBOTT,
 JENNIE M. GRANT.